(12) United States Patent
Kim et al.

(10) Patent No.: US 7,903,736 B2
(45) Date of Patent: Mar. 8, 2011

(54) FAST MODE-SEARCHING APPARATUS AND METHOD FOR FAST MOTION-PREDICTION

(75) Inventors: Byung Gyu Kim, Busan (KR); Suk Kyu Song, Busan (KR); Seon Tae Kim, Daejeon (KR); Pyeong Soo Mah, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1394 days.

(21) Appl. No.: 11/375,629

(22) Filed: Mar. 14, 2006

(65) Prior Publication Data

US 2007/0104274 A1 May 10, 2007

(30) Foreign Application Priority Data

Nov. 4, 2005 (KR) ........................ 10-2005-0105483

(51) Int. Cl.
*H04N 7/12* (2006.01)

(52) U.S. Cl. ............ 375/240.12; 375/240.08; 375/240.1; 375/240.16

(58) Field of Classification Search ............... 375/240.1, 375/240.12, 240.16, 240.19, 240.24
See application file for complete search history.

(56) References Cited

U.S. PATENT DOCUMENTS

| | | | | |
|---|---|---|---|---|
| 7,245,662 B2* | 7/2007 | Piche et al. | ................. | 375/240.2 |
| 7,746,928 B2* | 6/2010 | Wang et al. | ............... | 375/240.03 |
| 7,764,738 B2* | 7/2010 | Kim et al. | ................. | 375/240.12 |
| 7,778,329 B2* | 8/2010 | Hsieh et al. | ............... | 375/240.16 |
| 2005/0207494 A1* | 9/2005 | Ahn et al. | ................ | 375/240.16 |
| 2006/0285594 A1* | 12/2006 | Kim et al. | ................ | 375/240.16 |
| 2008/0273858 A1* | 11/2008 | Wald et al. | ....................... | 386/68 |

FOREIGN PATENT DOCUMENTS

| | | |
|---|---|---|
| KR | 10-20040093604 | 11/2004 |
| KR | 10-20050033099 | 4/2005 |
| WO | WO03107679 | 12/2003 |

* cited by examiner

*Primary Examiner* — Shuwang Liu
*Assistant Examiner* — Hirdepal Singh
(74) *Attorney, Agent, or Firm* — Ladas & Parry LLP

(57) ABSTRACT

Provided is a fast mode-searching apparatus and method for motion-prediction. The fast mode-searching apparatus includes a probability information obtaining unit, a first inter mode searching unit, a second inter mode searching unit, and a selective intra mode searching unit. The probability information obtaining unit detects whether at least one of a macroblock of a previous frame, a macroblock of a current frame, and adjacent macroblocks corresponds to at least one of P16×16, P16×8, and P8×16. The first inter mode searching unit performs an inter mode search on a block that is not detected by the probability information obtaining unit. The second inter mode searching unit determines whether the macroblock of the current frame corresponds to P16×16 as a result of performing the inter mode search on a block detected by the probability information obtaining unit. The selective intra mode searching unit performs an intra mode search if the macroblock of the current frame corresponds to P16×16.

16 Claims, 7 Drawing Sheets

CURRENT MACROBLOCK

MODE INFORMATION
PROPAGATION FOR PREDICTION

MODE INFORMATION
PROPAGATION FOR PREDICTION   910        920

FAST MODE-SEARCHING APPARATUS AND METHOD FOR FAST MOTION-PREDICTION

CROSS-REFERENCE TO RELATED PATENT APPLICATION

This application claims the benefit of Korean Patent Application No. 10-2005-0105483, filed on Nov. 4, 2005, in the Korean Intellectual Property Office, the disclosure of which is incorporated herein in its entirety by reference.

BACKGROUND OF THE INVENTION

1. Field of the Invention

The present invention relates to a fast variable-mode determining method required for motion estimation of a macroblock of a P-frame during H.264/AVC video compression.

2. Description of the Related Art

According to the H.264/AVC standard, to reduce residual data for an improvement in compression efficiency, a 16×16 macroblock is divided into sub-blocks, motion is searched in each of the sub-blocks, and a mode having the smallest error is selected and transmitted.

However, in such a scheme, as the number of divided sub-blocks increases, the number of motion vectors also increases up to 16. As a result, it is not possible to divide a macroblock into the smaller sub-blocks. Thus, in the H.264/AVC standard, a mode having a smallest number of required bits is selected using a rate-distortion (R-D) cost function and is then transmitted.

According to the H.264/AVC standard, in encoding of a P-frame during a video compression process, a full search for an intra mode is performed after a search for an inter mode, so as to determine a mode requiring the smallest R-D cost as a final mode. However, doing a search for an intra mode in all macroblocks of a P-frame for which a search for an inter mode is already performed requires a large amount of computation.

SUMMARY OF THE INVENTION

To overcome the drawbacks of a full search algorithm for mode determination, the present invention provides a fast mode-searching apparatus and method for fast motion-prediction, in which an effective classification method for an inter mode is suggested and the number of intra mode searches is reduced, thereby allowing fast motion-estimation.

According to one aspect of the present invention, there is provided a fast mode-searching apparatus for fast motion-prediction. The fast mode-searching apparatus includes a probability information obtaining unit, a first inter mode searching unit, a second inter mode searching unit, and a selective intra mode searching unit. The probability information obtaining unit detects whether at least one of a macroblock of a previous frame, a macroblock of a current frame, and adjacent macroblocks corresponds to at least one of P16×16, P16×8, and P8×16. The first inter mode searching unit performs an inter mode search on a block that is not detected by the probability information obtaining unit. The second inter mode searching unit determines whether the macroblock of the current frame corresponds to P16×16 as a result of performing the inter mode search on a block detected by the probability information obtaining unit. The selective intra mode searching unit performs an intra mode search if the macroblock of the current frame corresponds to P16×16.

The fast mode-searching apparatus may further include a best mode detecting unit selecting a final mode obtained as a result of the inter mode search by the first inter mode searching unit or the second inter mode searching unit as a best mode if the macroblock of the current frame does not correspond to P16×16, and selecting a best mode by comparing a rate-distortion (R-D) cost of a final mode obtained as a result of the inter mode search by the second inter mode searching unit and an R-D cost of a final mode obtained as a result of the intra mode search if the macroblock of the current frame corresponds to P16×16.

The probability information obtaining unit may further include a temporal information obtaining unit obtaining time information mode of the first P-frame of a current GOP (group-of-picture) by referring to the last P-frame of a previous GOP.

According to another aspect of the present invention, there is provided a fast mode-searching method for fast motion-prediction. The fast mode-searching method includes detecting whether at least one of a macroblock of a previous frame, a macroblock of a current frame, and adjacent macroblocks corresponds to at least one of P16×16, P16×8, and P8×16, performing a first inter mode search on a block that does not correspond to one of P16×16, P16×8, and P8×16, performing a second inter mode search on a block that corresponds to one of P16×16, P16×8, and P8×16 and determining whether the macroblock of the current frame corresponds to P16×16, and performing an intra mode search if the macroblock of the current frame corresponds to P16×16.

BRIEF DESCRIPTION OF THE DRAWINGS

The above and other features and advantages of the present invention will become more apparent by describing in detail an exemplary embodiment thereof with reference to the attached drawings in which.

DETAILED DESCRIPTION OF THE INVENTION

Figure 1:
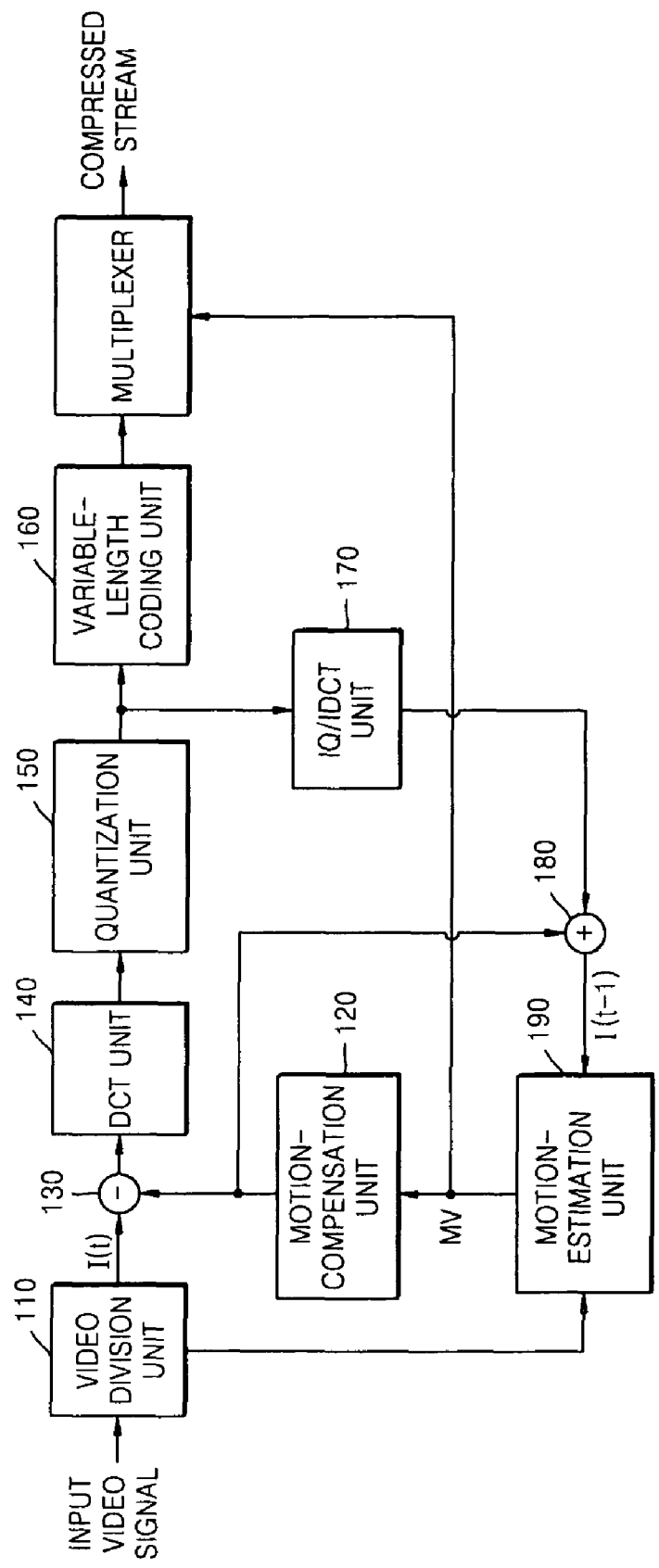
FIG. 1 is a block diagram for explaining video encoding through motion prediction.

Hereinafter, a preferred embodiment of the present invention will be described in detail with reference to the accompanying drawings. In the drawings, the same or similar elements are denoted by the same reference numerals even though they are depicted in different drawings. In the following description, a detailed description of known functions and configurations incorporated herein has been omitted for conciseness.

FIG. 1 is a block diagram for explaining video encoding through motion prediction.

Motion prediction of a current frame of an input video signal will be described with reference to FIG. 1. A block division unit 110 divides each frame of the input video signal into blocks. A subtraction unit 130 subtracts an output of a motion-compensation unit 120 from a current frame I(t). An output of the subtraction unit 130 is transformed by a discrete cosine transform (DCT) unit 140. A quantization unit 150 quantizes transformed coefficients.

A variable-length coding unit 160 generates a compressed stream using the quantized coefficients. An inverse quantization (IQ)/inverse DCT (IDCT) unit 170 inversely quantizes and inversely transforms an output of the quantization unit 150. An output of the IQ/IDCT unit 170 is reconstructed into the original video after passing through an addition unit 180. A motion-estimation unit 190 performs motion estimation or prediction on the current frame I(t) using the reconstructed video, e.g., a previous frame I(t−1).

Figure 2:
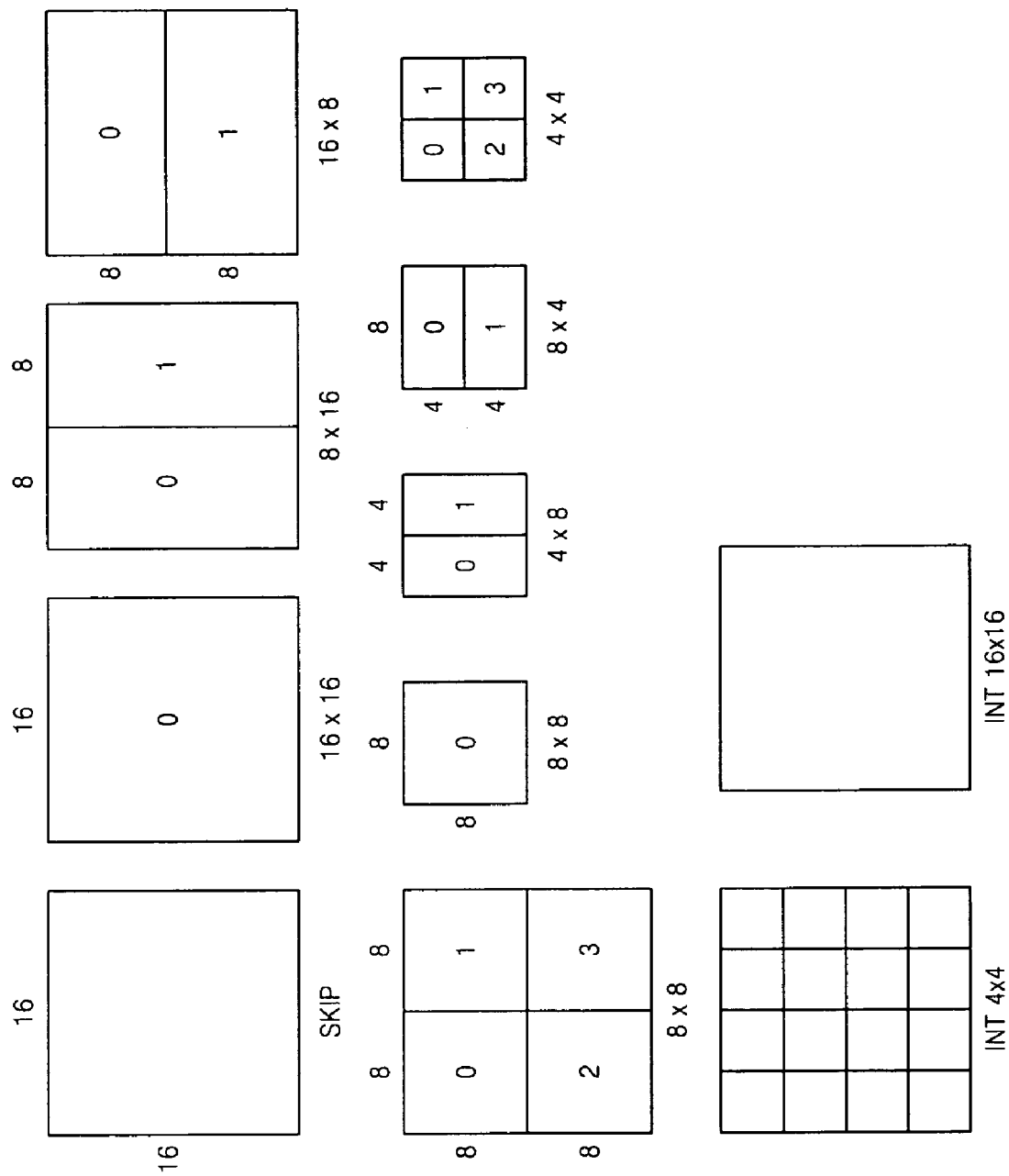
FIG. 2 illustrates inter modes and intra modes defined in the H.264/AVC video compression standard.

FIG. 2 illustrates inter modes and intra modes defined in the H.264/AVC video compression standard.

As illustrated in FIG. 2, there are a total of 7 inter modes. In determination of a final inter mode, the smallest R-D cost is obtained for each inter mode and a mode having the smallest R-D cost is determined as the final inter mode.

In intra modes, there are two block sizes. When a block size is 16×16, a search in 4 directions (modes) is required. When a block size is 4×4, a search in 9 directions (modes) is required. Like in inter modes, a mode having the smallest residual data (bitrate) among possible intra modes is determined as a final intra mode. In determination of a best mode, R-D costs of the final inter mode and the final intra mode are compared and a mode having the smaller R-D cost is determined as a best mode for a current macroblock.

FIGS. 3 through 5B illustrate the use of previously determined mode information of a macroblock of a previous frame, previously determined mode information of a macroblock of a current frame, and previously determined mode information of adjacent macroblocks during fast motion-prediction using a block matching algorithm in the present invention.

Figure 3:
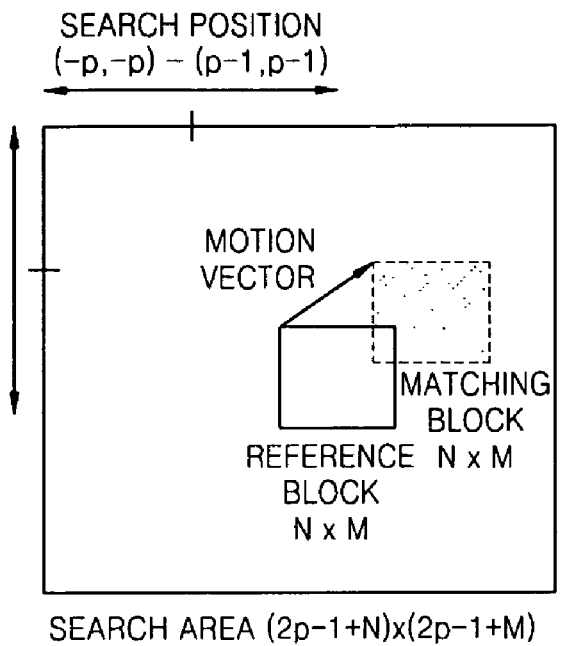
FIG. 3 is a view for explaining a block matching algorithm used for motion prediction in the present invention.

FIG. 3 is a view for explaining a block matching algorithm used for motion prediction in the present invention.

The block matching algorithm divides a current frame into several small N×M blocks (which will be referred to as reference blocks), searching for the most similar block (which will be referred to as a matching block) by comparing each reference block with various blocks in a predetermined area of a previous frame (an area obtained by movement of the reference block by −p through +(p−1) pixels in up/down and right/left directions, which will be referred to as a search area), and determines the relative position of the found matching block with respect to the reference block as a motion vector. Such motion estimation reduces correlation between two frames, thereby reducing the amount of data to be transmitted.

Figure 4:
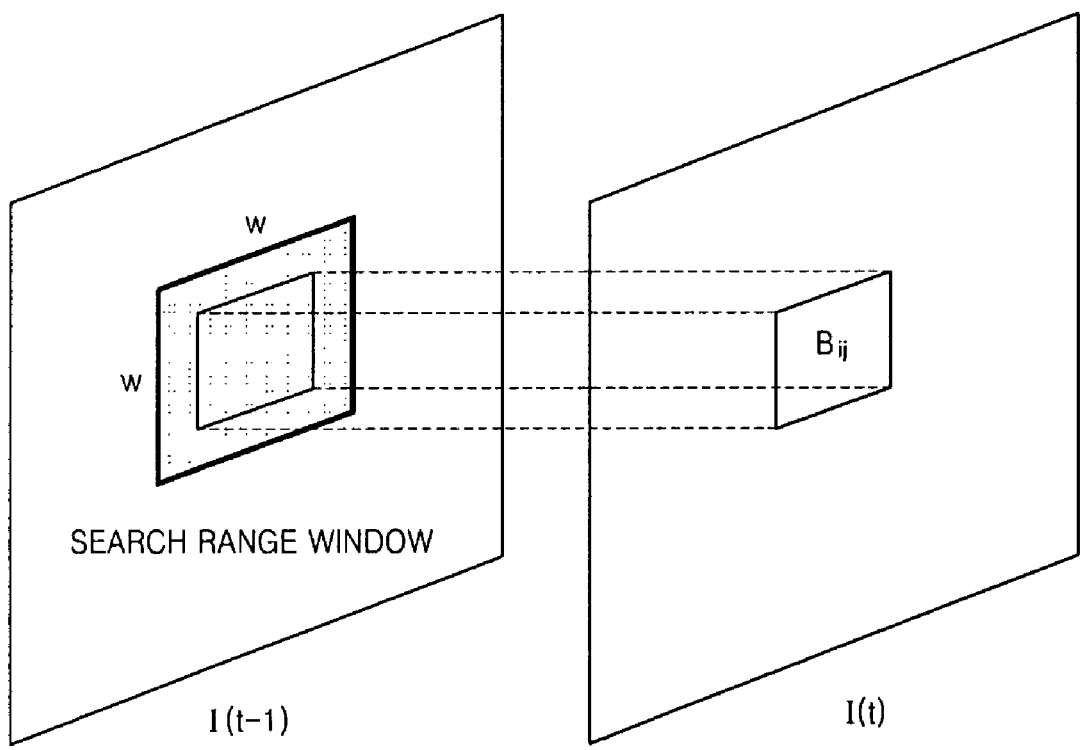
FIG. 4 illustrates a search range window in an adjacent previous frame I(t−1) for a block $B_{ij}$ of a current frame I(t)

FIG. 4 illustrates a search range window in an adjacent previous frame I(t−1) for a block $B_{ij}$ of a current frame I(t).

As illustrated in FIG. 4, the block matching algorithm divides the current frame I(t) into several reference blocks, searches for a block that is most similar to the reference block $B_{ij}$ in a search range window of the previous frame I(t−1), determines the relative position of the found block with respect to the reference block $B_{ij}$ as a motion vector, and transmits only a difference between the two blocks and the determined motion vector.

Figure 5A:
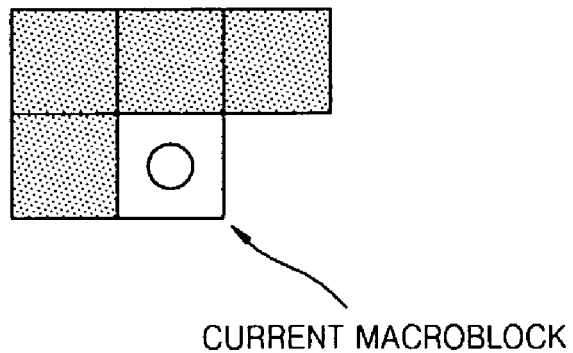
FIGS. 5A and 5B illustrate the use of adjacent macroblocks for inter mode prediction of a current macroblock.
Figure 5B:
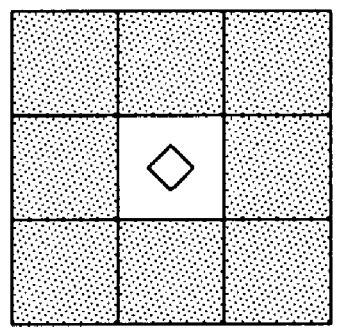

FIGS. 5A and 5B illustrate the use of adjacent macroblocks for inter mode prediction of a current macroblock.

In FIG. 5A, adjacent macroblocks of a current macroblock of the current frame I(t) are illustrated for the use of mode information of the adjacent macroblocks for inter mode prediction. In other words, previously determined mode information of a block located above and to the left of the current macroblock, a block located above the current macroblock, a block located to the left of the current macroblock, and a block located above and to the right of the current macroblock is used.

In FIG. 5B, a macroblock in the previous frame I(t−1), located at the same position as a current macroblock of the current frame I(t), and adjacent macroblocks of the macroblock are illustrated for inter mode prediction. Mode information of 8 adjacent macroblocks is used for mode prediction of the current macroblock.

Figure 6:
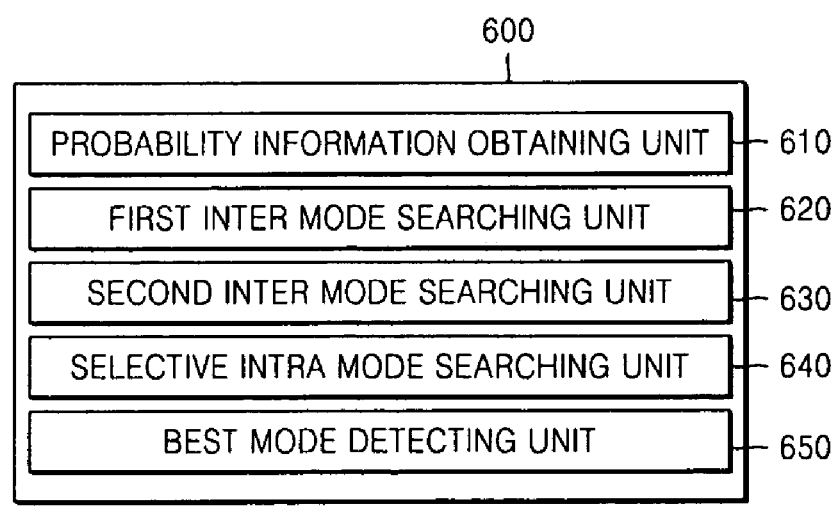
FIG. 6 illustrates a fast mode-searching apparatus for fast motion-prediction in a H.264/AVC video encoder according to a preferred embodiment of the present invention.

FIG. 6 illustrates a fast mode-searching apparatus 600 for fast motion-prediction in a H.264/AVC video encoder according to a preferred embodiment of the present invention.

The fast mode-searching apparatus 600 includes a probability information obtaining unit 610, a first inter mode searching unit 620, a second inter mode searching unit 630, a selective intra mode searching unit 640, and a best mode detecting unit 650.

The fast mode-searching apparatus 600 according to the present invention performs fast motion-prediction on a current macroblock through the first and second inter mode searching units 620 and 630 and the selective intra mode searching unit 640.

More specifically, the probability information obtaining unit 610 obtains temporal and spatial contextual information with respect to the current macroblock using a method illustrated in FIGS. 3 through 5B. A case where at least one of a macroblock of a previous frame, a macroblock of a current frame, and adjacent macroblocks corresponds to at least one of P16×16, P16×8, and P8×16 is detected and a time information mode of the first P-frame of a current group-of-picture (GOP) is obtained with reference to the last P-frame of a previous GOP using a temporal information obtaining unit (not shown). The temporal information obtaining unit will be described in more detail with reference to FIGS. 8 and 9.

The probability information obtaining unit 610 obtains mode prediction information for a current macroblock from available adjacent macroblocks of a previous frame and a current frame. To this end, the probability information obtaining unit 610 uses a score function as follows:

$$S(x, y) = \sum_{(i,j) \in Hpreviousframe} Q \, Bin_{ij}(M_{ij}) + \sum_{(i,j) \in Hcurrentframe} Q \, Bin_{ij}(M_{ij}), \quad (1)$$

where $Bin_{ij}(M_{ij})$ is a counting function that increases a count value by 1 when a block mode is one of P16×16, P16×8, and P8×16. In other words, using $Bin_{ij}(M_{ij})$, it is determined with how many adjacent modes are related with P16×16 sub-mode groups. As S(x,y) increases, a probability that a current macroblock is included in the P16×16 sub-mode groups increases.

The probability mode obtaining unit 610 classifies an inter mode into P16×16 sub-mode groups and P8×8 sub-mode groups using the score function and searches a current macroblock without estimating a motion vector for any mode.

The probability mode obtaining unit 610 classifies an inter mode into P16×16 sub-mode groups and P8×8 sub-mode groups as follows:

$$\begin{cases} \text{If } S(x, y) > 0, & P16 \times 16 \text{ sub-mode group search} \\ \text{Otherwise}, & P8 \times 8 \text{ sub-mode group search} \end{cases} \quad (2)$$

As can be seen from Equation (2), if at least one block is associated with the P16×16 sub-mode groups, a search for the P16×16 sub-mode groups is performed on a current macroblock.

The first inter mode searching unit 620 performs an inter mode search on a block that does not correspond to any one of P16×16, P16×8, and P8×16, i.e., a block that corresponds to P8×8 sub-mode groups.

The first inter mode searching unit 620 performs a P8×8 inter mode search, a P8×4 inter mode search, a P4×8 inter mode search, and a P4×4 inter mode search on each of blocks included in the P8×8 sub-mode groups (P8×8, P8×4, P4×8, and P4×4). The first inter mode searching unit 620 then selects a final mode obtained through the inter mode searches as a best mode.

The second inter mode searching unit 630 performs a P16×16 inter mode search, a P16×8 inter mode search, and a P8×16 inter mode search on each of blocks included in the P16×16 sub-mode groups (P16×16, P16×8, and P8×16).

The selective intra mode searching unit 640 performs an intra mode search if the second inter mode searching unit 630 determines that a macroblock of the current frame corresponds to P16×16.

In general, the number of macroblocks corresponding to an intra mode in a P-frame is 1 or 2. Thus, it is inefficient to search for all possible intra modes in each block for a small number of intra modes.

Figure 7:
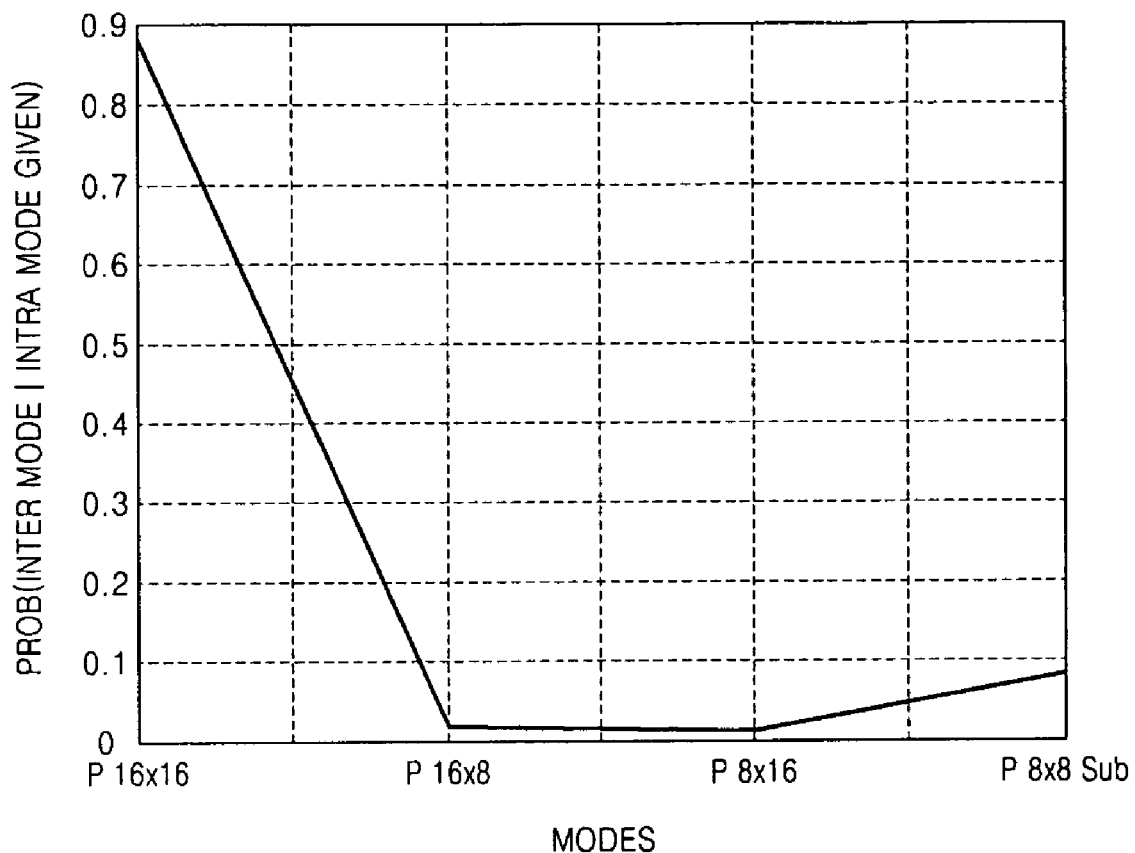
FIG. 7 is a graph showing an experimentally obtained probability that a macroblock corresponding to an intra mode corresponds to an inter mode.

Thus, the selective intra mode searching unit 640 solves the problem using the characteristic of a probability of an intra mode occurring. In other words, it can be seen that most intra modes appear in P16×16 among inter modes as illustrated in FIG. 7.

Based on the characteristic of the probability of an intra mode occurring, the selective intra mode searching unit 640 performs an intra mode search only in P16×16 and does not perform an intra mode search in the other inter modes, instead of searching for an intra mode in all blocks corresponding to an inter mode. In this way, fast mode selection is possible.

If the second inter mode searching unit 630 determines that a macroblock of the current frame does not correspond to P16×16, the best mode detecting unit 650 detects a final mode obtained by the first inter mode searching unit 620 or the second inter mode searching unit 630 as a best mode.

If a macroblock of the current frame corresponds to P16×16, i.e., if an intra mode search is required, the best mode detecting unit 650 compares an R-D cost of a final mode obtained as a result of the inter mode search by the second inter mode searching unit 630 and an R-D cost of a final mode obtained as a result of the intra mode search to select a best mode.

In case of a block that does not correspond to P16×16 and does not require an intra mode search, a best inter mode is a final mode.

FIG. 7 is a graph showing an experimentally obtained probability that a macroblock corresponding to an intra mode also corresponds to an inter mode.

As can be seen from FIG. 7, most intra modes appear in P16×16 among inter modes. Thus, an intra mode search is performed only in P16×16 based on a conditional probability characteristic that can be found in a video screen and an intra mode search is not performed in the other inter modes, thereby reducing the number of intra mode searches.

Figure 8:
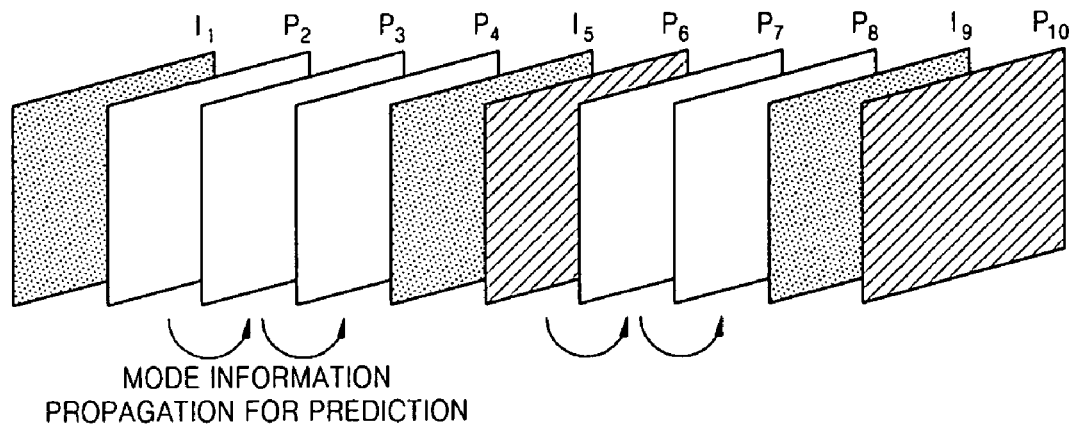
FIGS. 8 and 9 illustrate a process of obtaining inter mode information to be referred to for mode prediction.
Figure 9:
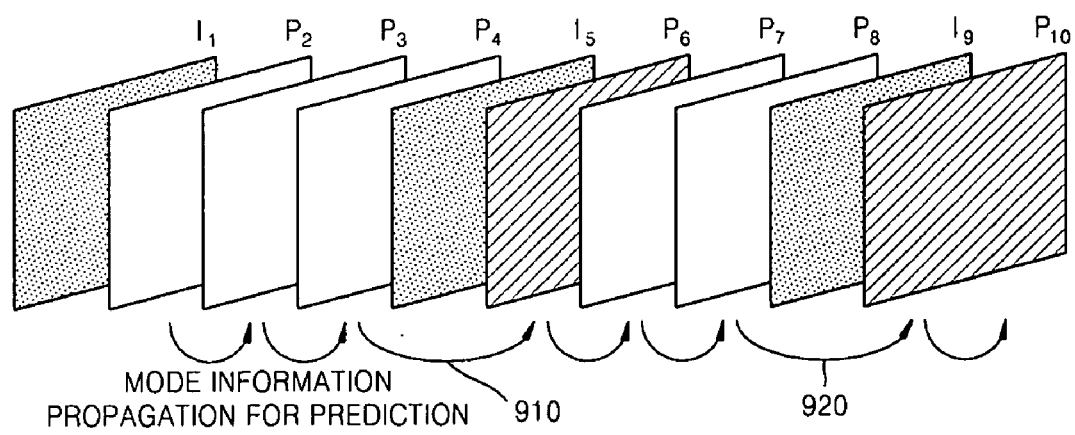

FIGS. 8 and 9 illustrate a process of obtaining inter mode information to be referred to for mode prediction.

For fast inter-mode searching according to the present invention, mode information of adjacent macroblocks in a previous frame is required. However, when a previous frame is an intra frame like $P_6$ and $P_{10}$ illustrated in FIG. 8, a P-frame immediately following an intra frame in a GOP does not include inter mode information to be referred to because the previous frame is intra-coded. Thus, in this case, a new reference method is added to use mode information for inter mode prediction in the present invention.

As illustrated in FIG. 9, in spite of a time interval of two frames as indicated by 910 and 920, two frames have high correlation. Thus, in the present invention, a time information mode for the first P-frame of a current GOP is obtained from the last P-frame of a previous GOP.

The probability information obtaining unit 610 obtains a time information mode of the first P-frame of the current GOP from the last P-frame of the previous GOP.

Figure 10:
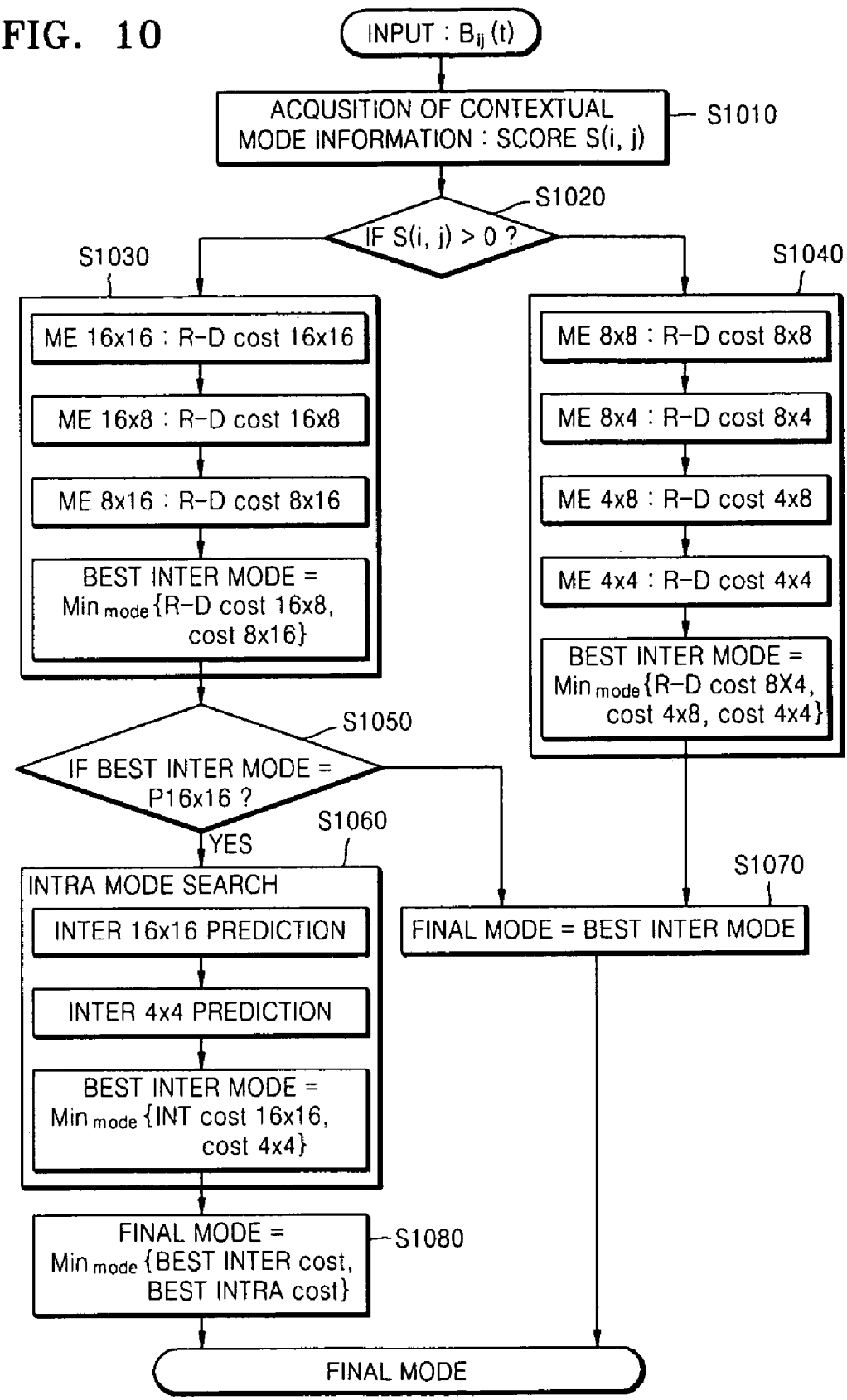
FIG. 10 is a flowchart illustrating a fast mode-searching method for fast motion-prediction according to a preferred embodiment of the present invention.

FIG. 10 is a flowchart illustrating a fast mode-searching method for fast motion-prediction according to a preferred embodiment of the present invention.

In operation S1010, it is detected whether at least one of a macroblock of a previous frame, a macroblock of a current frame, and adjacent macroblocks corresponds to at least one of P16×16, P16×8, and P8×16.

A block corresponding to one of P16×16, P16×8, and P8×16 is classified into P16×16 sub-mode groups and the other blocks are classified into P8×8 sub-mode groups in operation S1020. At this time, the probability information obtaining unit 610 of FIG. 6 performs classification using a classification method like Equation (2).

Thereafter, an inter mode search is performed on the P16×16 sub-mode groups and the P8×8 sub-mode groups in operations S1030 and S1040. If it is determined that a macroblock of a current macroblock corresponds to P16×16 in operation S1050, an intra mode search is performed in operation S1060.

For a block that does not undergo an intra mode search, a final mode is determined as a best mode in operation S1070. For a block that undergoes an intra mode search, an R-D cost of a best inter mode and an R-D cost of a best intra mode are compared and a mode having the smaller R-D cost is determined as a best mode in operation S1080.

As described above, according to the present invention, an efficient inter mode classification method is suggested to improve a fast mode-searching method. In addition, the number of intra mode searches is reduced using a probability of an intra mode occurring, thereby allowing fast motion-estimation and mode-determination for real-time video compression.

Moreover, a speed in determining a mode for each block in a H.264/AVC variable block-based video compression system is improved, contributing to an improvement in a real-time compression function of the video compression system in terms of software.

Furthermore, by combining the suggested fast mode-searching method and a conventional fast motion vector estimating method, a faster video encoding system can be implemented.

Meanwhile, the present invention can also be embodied as a computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves. The computer-readable recording medium can also be distributed over network coupled computer systems so that the computer-readable code is stored and executed in a distributed fashion.

While the present invention has been particularly shown and described with reference to an exemplary embodiment thereof, it will be understood by those of ordinary skill in the art that various changes in form and details may be made therein without departing from the spirit and scope of the present invention as defined by the following claims.

What is claimed is:

1. A fast mode-searching apparatus for fast motion-prediction, the fast mode-searching apparatus comprising:

a probability information obtaining unit using a score function $S(x,y)$ to determine whether at least one of a macroblock of a previous frame, a macroblock of a current frame, and adjacent macroblocks corresponds to P16×16 sub-mode groups comprising at least one of P16×16, P16×8, and P8×16 or corresponds to P8×8 sub-mode groups comprising at least one of P8×8, P8×4, P4×8, and P4×4 in which $$S(x, y) = \sum_{(i,j) \in Hpreviousframe} Bin_{ij}(M_{ij}) + \sum_{(i,j) \in Hcurrentframe} Bin_{ij}(M_{ij})$$

where $Bin_{ij}(M_{ij})$ is a counting function that increases a count value by 1 when a block mode Is one of P16×16, P16×8, and P8×16, wherein when $S(x,y)>0$ an inter mode is classified into P16×16 sub-mode groups and otherwise the inter mode is classified into P8×8 sub-mode groups;

a first inter mode searching unit performing an inter mode search on a block that is not detected by the probability information obtaining unit;

a second inter mode searching unit determining whether the macroblock of the current frame corresponds to P16×16 as a result of performing the inter mode search on a block detected by the probability information obtaining unit; and a selective intra mode searching unit performing an intra mode search if the macroblock of the current frame corresponds to P16×16.

2. The fast mode-searching apparatus of claim 1, further comprising a best mode detecting unit selecting a final mode obtained as a result of the inter mode search by the first inter mode searching unit or the second inter mode searching unit as a best mode if the macroblock of the current frame does not correspond to P16×16, and selecting a best mode by comparing an R-D (rate-distortion) cost of a final mode obtained as a result of the inter mode search by the second inter mode searching unit and an R-D cost of a final mode obtained as a result of the intra mode search if the macroblock of the current frame corresponds to P16×16.

3. The fast mode-searching apparatus of claim 1, wherein the first inter mode searching unit performs the inter mode search in P8×8, P8×4, P4×8 and P4×4.

4. The fast mode-searching apparatus of claim 1, wherein the second inter mode searching unit performs the inter mode search in P16×16, P16×8, and P8×16.

5. The fast mode-searching apparatus of claim 1, wherein the probability information obtaining unit comprises a temporal information obtaining unit obtaining time information mode of the first P-frame of a current GOP (group-of-picture) by referring to the last P-frame of a previous GOP.

6. A fast mode-searching method for fast motion-prediction, the fast mode-searching method comprising:

detecting using a score function $S(x,y)$ to determine whether at least one of a macroblock of a previous frame, a macroblock of a current frame, and adjacent macroblocks corresponds to P16×16 sub-mode groups comprising at least one of P16×16, P16×8, and P8×16, or corresponds to P8×8 sub-mode groups comprising at least one of P8×8, P8×4, P4×8, and P4×4 in which $$S(x, y) = \sum_{(i,j) \in Hpreviousframe} Bin_{ij}(M_{ij}) + \sum_{(i,j) \in Hcurrentframe} Bin_{ij}(M_{ij})$$

where $Bin_{ij}(M_{ij})$ is a counting function that increases a count value by 1 when a block mode is one of P16×16, P16×8, and P8×16, wherein when $S(x,y)>0$ an inter mode is classified into P16×16 sub-mode groups and otherwise the inter mode is classified into P8×8 sub-mode groups;

performing a first inter mode search on a block that does not correspond to one of P16×16, P16×8, and P8×16;

performing a second inter mode search on a block that corresponds to one of P16×16, P16×8, and P8×16 and determining whether the macroblock of the current frame corresponds to P16×16; and performing an intra mode search if the macroblock of the current frame corresponds to P16×16.

7. The fast mode-searching method of claim 6, further comprising:

selecting a final mode obtained as a result of the first inter mode search or the second inter mode search as a best mode if the macroblock of the current frame does not correspond to P16×16; and selecting a best mode by comparing an R-D(rate-distortion) cost of a final mode obtained as a result of the second inter mode search and an R-D cost of a final mode obtained as a result of the intra mode search if the macroblock of the current frame corresponds to P16×16.

8. The fast mode-searching method of claim 6, wherein the first inter mode search is performed in P8×8, P8×4, P4×8 and P4×4.

9. The fast mode-searching method of claim 6, wherein the second inter mode search is performed in P16×16, P16×8, and P8×16.

10. The fast mode-searching method of claim 6, wherein the detection comprises obtaining time information mode of the first P-frame of a current GOP (group-of-picture) by referring to the last P-frame of a previous GOP.

11. A non-transitory computer readable medium having coded instructions for carrying out a fast mode-searching method for performing fast motion-prediction, the coded instructions of the fast mode-searching method comprising:

coded instructions for detecting using a score function $S(x,y)$ to determine whether at least one of a macroblock of a previous frame, a macroblock of a current frame, and adjacent macroblocks corresponds to P16×16 sub-mode groups comprising at least one of P16×16, P16×8, and P8×16, or corresponds to P8×8 sub-mode groups comprising at least one of P8×8, P8×4, P4×8, and P4×4 in which $$S(x, y) = \sum_{(i,j) \in Hpreviousframe} Bin_{ij}(M_{ij}) + \sum_{(i,j) \in Hcurrentframe} Bin_{ij}(M_{ij})$$

where $Bin_{ij}(M_{ij})$ is a counting function that increases a count value by 1 when a block mode is one of P16×16, P16×8, and P8×16 wherein when $S(x,y)>0$ an inter mode is classified into P16×16 sub-mode groups and otherwise the inter mode is classified into P8×8 sub-mode groups;

coded instructions for performing a first inter mode search on a block that does not correspond to one of P16×16, P16×8, and P8×16;

coded instructions performing a second inter mode search on a block that corresponds to one of P16×16, P16×8, and P8×16 and determining whether the macroblock of the current frame corresponds to P16×16; and coded instructions performing an intra mode search if the macroblock of the current frame corresponds to P16×16.

12. The non-transitory computer readable medium of claim 11, further comprising:

coded instructions selecting a final mode obtained as a result of the first inter mode search or the second inter mode search as a best mode if the macroblock of the current frame does not correspond to P16×16; and coded instructions selecting a best mode by comparing an R-D(rate-distortion) cost of a final mode obtained as a result of the second inter mode search and an R-D cost of a final mode obtained as a result of the intra mode search if the macroblock of the current frame corresponds to P16×16.

13. The non-transitory computer readable medium of claim 11, wherein the first inter mode search is performed in P8×8, P8×4, P4×8, and P4×4.

14. The non-transitory computer readable medium of claim 11, wherein the second inter mode search is performed in P16×16, P16×8, and P8×16.

15. The non-transitory computer readable medium of claim 11, wherein the detection comprises obtaining time information mode of the first P-frame of a current GOP (group-of-picture) by referring to the last P-frame of a previous GOP.

16. The non-transitory computer readable medium of claim 11, wherein the non-transient computer readable medium is selected from the group consisting of read-only memory (ROM), random-access memory (RAM), CD-ROMs, magnetic tapes, floppy disks, and optical data storage devices.

* * * * *